(12) United States Patent
Okubo et al.

(10) Patent No.: US 8,388,125 B2
(45) Date of Patent: Mar. 5, 2013

(54) INKJET RECORDING INK

(75) Inventors: Taketoshi Okubo, Asaka (JP); Atsuhito Yoshizawa, Kawasaki (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/033,466

(22) Filed: Feb. 23, 2011

(65) Prior Publication Data

US 2011/0205285 A1    Aug. 25, 2011

(30) Foreign Application Priority Data

Feb. 24, 2010 (JP) ................... 2010-039064

(51) Int. Cl.
*G01D 11/00* (2006.01)
(52) U.S. Cl. ............... 347/100; 347/95; 106/31.6
(58) Field of Classification Search ......... 347/100, 347/95, 96, 101, 20, 21, 9; 106/31.6, 31.13, 106/31.27; 523/160, 161
See application file for complete search history.

(56) References Cited

U.S. PATENT DOCUMENTS

| | | | |
|---|---|---|---|
| 4,723,129 A | 2/1988 | Endo | |
| 5,609,671 A | 3/1997 | Nagasawa | |
| 5,707,432 A | 1/1998 | Adams | |
| 5,985,016 A | 11/1999 | Tsang | |
| 2002/0036677 A1 | 3/2002 | Watanabe | |
| 2003/0095914 A1 | 5/2003 | Belmont | |
| 2005/0204957 A1 | 9/2005 | Momose | |
| 2007/0044682 A1 | 3/2007 | Nick | |
| 2007/0100023 A1 | 5/2007 | Burns | |
| 2008/0260948 A1* | 10/2008 | Katsuragi et al. ............ 106/31.6 |
| 2010/0165019 A1 | 7/2010 | Koike | |

FOREIGN PATENT DOCUMENTS

| | | | |
|---|---|---|---|
| JP | 11-222573 A | | 8/1999 |
| JP | 2002-201390 A | | 7/2002 |
| JP | 3405817 B2 | | 5/2003 |
| JP | 2004209762 A | * | 7/2004 |
| JP | 3808504 B2 | | 8/2006 |
| JP | 4001922 B2 | | 10/2007 |
| JP | 4189258 B2 | | 12/2008 |
| JP | 2009-506196 T | | 2/2009 |
| JP | 2009-515007 T | | 4/2009 |
| WO | 2009/014241 A1 | | 1/2009 |

* cited by examiner

*Primary Examiner* — Manish S Shah
(74) *Attorney, Agent, or Firm* — Canon U.S.A. Inc., IP Division

(57) ABSTRACT

An inkjet recording ink having a surface tension of 34 mN/m or more is provided. The inkjet recording ink contains an anionic self-dispersion pigment having an anionic functional group, a salt, and a water-soluble compound having a hydrophilicity/hydrophobicity coefficient of 0.26 or more. The ink contains a larger amount of cesium ion than the amount of the anionic functional group. The hydrophilicity/hydrophobicity coefficient is defined by equation (A).

2 Claims, 4 Drawing Sheets

INKJET RECORDING INK

BACKGROUND OF THE INVENTION

1. Field of the Invention

The present invention relates to an inkjet recording ink.

2. Description of the Related Art

When recording is performed on plain paper by an inkjet recording method using an inkjet recording ink (hereinafter may be simply referred to as the ink), ink droplets landing on the paper penetrate between fibers of the paper. Consequently, the printed image may be degraded in optical density and quality. The easier the ink penetrates, the easier these problems occur.

International Publication No. 2009/014241 discloses a penetrative ink allowing a record having a high optical density to be made on plain paper.

However, if a salt or a less hydrophilic solvent is used in this ink to increase the optical density of the resulting image, the pigment of the ink is solidified by moisture evaporation to clog nozzles.

SUMMARY OF THE INVENTION

The present invention provides an inkjet recording ink that can produce images having high optical density in spite of rapidly penetrating into plain paper, and can prevent nozzles from being clogged.

According to an aspect of the invention, an inkjet recording ink having a surface tension of 34 mN/m or less is provided. The inkjet recording ink contains water, an anionic self-dispersion pigment having an anionic functional group, a salt, and a water-soluble compound having a hydrophilicity-hydrophobicity coefficient of 0.26 or more. The inkjet recording ink contains X mol/g in total of the anionic functional group and Y mol/g of cesium ion, satisfying the relationship X<Y. The hydrophilicity/hydrophobicity coefficient is defined by equation (A):

$$\text{Hydrophilicity/hydrophobicity coefficient} = \frac{(20\% \text{ aqueous solution water activity}) - (\text{molar fraction of water in 20\% aqueous solution})}{1 - (\text{molar fraction of water in 20\% aqueous solution})} \quad (A)$$

The present invention can provide an inkjet recording ink that can produce images having high optical density in spite of rapidly penetrating into plain paper, and can prevent nozzles from being clogged.

Further features of the present invention will become apparent from the following description of exemplary embodiments with reference to the attached drawings.

DESCRIPTION OF THE EMBODIMENTS

Figure 1:
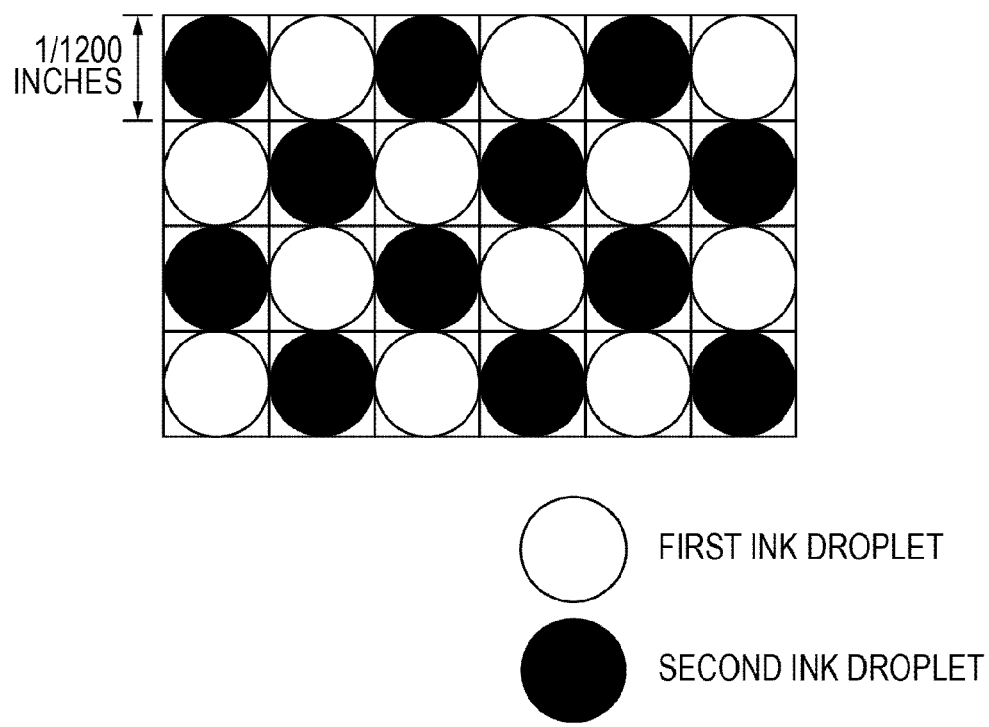
FIG. 1 is a representation of a method for forming recording dots.

The present invention will be further described using exemplary embodiments.

The present inventors have conducted research on inkjet recording inks to solve the above issue, and found that when an ink contains water, an anionic self-dispersion pigment having an anionic functional group, a salt and a water-soluble compound having a hydrophilicity/hydrophobicity coefficient of 0.26 or more, and when the content of the anionic functional group is higher than the cesium ion content, these constituents produce a synergism. It has been found that when such an ink composition is used for printing plain paper, it can produce incompatible effects. That is, the ink composition can increase the optical density and prevent nozzles from being clogged (that is, increase the resistance to nozzle clogging).

In an ink, the anionic functional group of an anionic self-dispersion pigment and its counter ion are hydrated, and they are present in the ink without being combined with each other. When droplets of the ink have landed on plain paper, the cellulose fibers or filler of the plain paper take hydrated water from the anionic functional group and the counter ion. Consequently, the anionic functional group and the counter ion are combined with each other. Thus, the pigment particles are aggregated to precipitate. If the counter ion to the anionic functional group is sodium ion or lithium ion having a high hydration force, the self-dispersion pigment contains a large amount of hydrated water. Accordingly, in order to precipitate the pigment after landing on the paper, a large amount of water must be absorbed into the cellulose fibers. Since it takes a long time until the pigment precipitates, the pigment penetrates deep into the paper after landing on the paper. Consequently, the optical density is reduced. On the other hand, if the counter ion of the self-dispersion pigment is potassium ion or cesium ion having a low hydration force, the self-dispersion pigment contains a relatively small amount of hydrated water. Accordingly, the pigment precipitates in a shorter time, and is fixed on the surface of the paper to form a recorded image having a high optical density. Furthermore, the present inventors have found that when an ink containing liquid components including water and a water-soluble compound having a high hydrophilicity/hydrophobicity coefficient (described later) is applied onto paper, the liquid components rapidly separate from the self-dispersion pigment (solid-liquid separation occurs) and, accordingly, the self-dispersion pigment can precipitate in a short time. Consequently, by combining this effect with the effect of the potassium or cesium ion increasing the optical density, a recorded image having an extremely high optical density can be formed.

Such an ink composition can be a super-penetrable ink capable of forming recorded images having a high optical density. However, since the ink is designed so that the pigment precipitates immediately after landing on paper, it is liable to clog nozzles. For this issue, the present inventors have found that an ink containing a larger amount of cesium ion than the amount of the anionic functional group of the self-dispersion pigment can form an image having a higher optical density without easily clogging nozzles. This can be because of the following reasons.

In an ink containing a larger amount of cesium ion than the amount of anionic functional group of the self-dispersion pigment, most of the counter ion to the anionic functional group is cesium ion. Therefore, the pigment can rapidly precipitate to form a recorded image having a high optical density after landing on paper. Meanwhile, if moisture evaporates from the ejection orifice of a nozzle, the solvent in the ink is concentrated around the ejection orifice. The ink of the present embodiment contains a water-soluble compound having a high hydrophilicity/hydrophobicity coefficient (described later), that is, a rather hydrophobic water-soluble compound, as a solvent. Anionic self-dispersion pigments containing cesium ion as the counter ion to the anionic functional group are likely to have higher affinity for water-soluble compounds than self-dispersion pigments containing other counter ions, such as potassium ion or sodium ion, and are accordingly difficult to precipitate even if the solvent is concentrated. In other words, inks containing a larger amount of cesium ion do not easily cause nozzles to be clogged.

When a cesium salt, whose counter anion is also hydrated, is added as the cesium ion, the salt tends to be difficult to concentrate with the solvent even if moisture is evaporated to concentrate the solvent around the ejection orifice of a nozzle, because the salt has a low affinity for the solvent and is not easily concentrated together with the solvent. Consequently, the cesium salt moves into the nozzle deeper from the ejection orifice, and is not likely to precipitate around the ejection orifice.

As described above, in the ink of the present embodiment, the cesium ion, the salt and the water-soluble compound having a high hydrophilicity/hydrophobicity coefficient (0.26 or more) that are constituents of the ink produce the synergistic effect of achieving both a high optical density and a high resistance to nozzle cogging, which are intrinsically incompatible with each other.

Inkjet Recording Ink
Coloring Material

The inkjet recording ink of the present embodiment contains an anionic self-dispersion pigment as a coloring material. In the present embodiment, the anionic self-dispersion pigment has an anionic functional group that has been introduced to the surfaces of the pigment particles directly or with another atomic group so as to be stably dispersed. The anionic pigment does not require a dispersant in principle for being dispersed in an aqueous medium. The anionic self-dispersion pigment may be prepared by imparting dispersion stability to a known pigment listed in, for example, International Publication No. 2009/014242. The anionic functional group mentioned herein refers to a functional group whose molecules are ionized to release hydrogen ions at a rate of half or more at pH 7.0. Anionic groups used in the present embodiment include anionic functional groups being anions formed by ionizing hydrogen, such as —COO$^-$. More specifically, examples of the anionic functional group include carboxyl, sulfo and phosphonate. Among those, the carboxyl group and the phosphonate group may be used from the viewpoint of enhancing the optical density.

In order to introduce an anionic functional group to the surfaces of pigment particles, for example, carbon black may be oxidized. Oxidation may be performed using a hypochlorite, ozonated water, hydrogen peroxide, a chlorite, nitric acid and so forth. From the viewpoint of enhancing the optical density, carbon black surface-treated with sodium hypochlorite can be used. For oxidizing carbon black, other surface treatment may be applied using a diazonium salt as disclosed in, for example, Japanese Patent No. 3808504 and PCT Japanese Translation Patent Publication Nos. 2009-515007 and 2009-506196. Commercially available pigments having hydrophilic functional groups at the surfaces of the particles include CW-1, CW-2 and CW-3 (produced by Orient Chemical), and CAB-O-JET 200, CAB-O-JET 300 and CAB-O-JET 400(produced by Cabot). The above cited CW-2 and CAB-O-JET 300 are each self-dispersing carbon black having an ionized carboxyl group as the anionic functional group and containing a sodium ion as the counter ion. Hence, they are carbon blacks having —COONa. Examples of the counter ion include alkali metal ions, such as lithium ion, sodium ion, potassium ion, rubidium ion and cesium ion; ammonium ion; and ions derived from amines such as methylamine, ethylamine, dimethylamine, 2-hydroxyethylamine, di(2-hydroxyethyl)amine and tri(2-hydroxyethyl)amine.

The self-dispersion pigment can have an average particle size of 60 nm or more, such as 70 nm or more. The average particle size can be 145 nm or less, such as 140 nm or less or 130 nm or less. These particle sizes are values measured in liquid by dynamic light scattering. More specifically, the average particle size may be measured with, for example, FPAR-1000 (manufactured by Otsuka electronics, cumulant analysis) or Nanotrac UPA 150EX (manufacture by Nikkiso, measuring as 50% cumulative value) by laser beam scattering.

Two types or more of self-dispersion pigment may be combined in an ink, if necessary. The self-dispersion pigment content in the ink can be 0.5% by mass or more, such as 1.0% by mass or more or 2.0% by mass or more. Also, it can be 15.0% by mass or less, such as 10.0% by mass or less or 8.0% by mass or less.

The amount of the anionic functional group of the self-dispersion pigment may be measured by a method described in, for example, "Saishin Carbon Black Gijutsu Dai-Zenshu (in Japanese, Corpus of latest carbon black technology), edited by Technical Information Institute Co., Ltd." The amount of the anionic functional group may be measured, for example, by pyrolysis gas chromatography disclosed in Japanese Patent No. 4189258 or Zeisel's method disclosed in Japanese Patent No. 3405817, by measuring ion concentration after ion exchange, as disclosed in Japanese Patent Laid-Open No. 11-222573, or by a method using an ion meter disclosed in Japanese Patent Laid-Open No. 2002-201390.

Cesium Ion

The inkjet recording ink of the present embodiment contains a larger amount of cesium ion (Y µmol/g) than the total amount of anionic functional group (X µmol/g) of the self-dispersion pigment; hence, X<Y holds. In the present embodiment, X+5≦Y can hold, and further X+10≦Y can hold. By setting the amount X of anionic functional group and the amount Y of cesium ion so as to satisfy the above relationship, the optical density can be enhanced effectively without degrading the resistance to nozzle clogging.

The cesium ion may be introduced to the ink by further adding a cesium salt after preparing an anionic self-dispersion pigment containing cesium ion as the counter ion. Alternatively, a cesium salt may be added to an anionic self-dispersion pigment having a counter ion other than cesium ion in such a proportion as the amount of the cesium salt is larger than the amount of the anionic functional group of the self-dispersion pigment. The anionic self-dispersion pigment containing a cesium ion as the counter ion may be prepared by the following method. For example, a pigment may be oxidized with an oxidizing agent such as cesium hypochlorite. Alternatively, an ion exchange method disclosed in Japanese Patent No. 4001922 or Japanese Patent Laid-Open No. 11-222573 may be applied in which the counter ion is exchanged by repeating the operation of adding an aqueous solution of a cesium salt, such as cesium hydroxide or cesium chloride, to a self-dispersion pigment and deionizing the pigment.

The cesium ion content in the inkjet recording ink can be in the range of 20.0 to 100.0 µmol/g, such as 25.0 to 75.0 µmol/g or 40.0 to 60.0 µmol/g. Also, the total content of anionic functional group of the self-dispersion pigment in the inkjet recording ink can be in the range of 1.0 to 20.0 µmol/g, such as 5.0 to 15.0 µmol/g.

Salt

The inkjet recording ink of the present embodiment can contain a cesium salt so as to satisfy the requirement that it contains a larger amount (Y mol/g) of cesium ion than the anionic functional group (X mol/g). The cesium salt can be selected from the cesium salts of alkylcarboxylic acids, arylcarboxylic acid, alkylsulfonic acids, sulfuric acid, phosphoric acid, and carbonic acid. Examples of such cesium salt include cesium sulfate, cesium methanesulfonate, cesium tartarate, and cesium chloride. Although the reason is not clear, it may be the case, from the viewpoint of enhancing the optical density, that an ink containing cesium methanesulfonate is used as the cesium salt. A single salt may be used, or a plurality of salts may be combined.

The inkjet recording ink of the present embodiment may contain other salts in addition to the cesium salt as long as a larger amount (Y mol/g) of cesium ion is contained than the anionic functional group (X mol/g).

An organic acid refers to an acid having a molecular structure formed of carbon atoms having at least one functional group whose hydrogen is ionized at pH around neutrality, such as carboxyl, phosphonate, or sulfo. Exemplary organic acids include alkylcarboxylic acids, such as citric acid, succinic acid, formic acid, acetic acid, propionic acid, oxalic acid, tartaric acid, gluconic acid, tartronic acid, maleic acid, malonic acid, and adipic acid; arylcarboxylic acids, such as benzoic acid, phthalic acid, and trimellitic acid; alkylsulfonic acids, such as methanesulfonic acid and ethanesulfonic acid; and arylsulfonic acids, such as benzenesulfonic acid and naphthalenesulfonic acid. From the viewpoint of the optical density and the resistance to nozzle clogging, the following acids can be selected: water-soluble alkylcarboxylic acids, such as formic acid, acetic acid, and propionic acid; alkylcarboxylic acids including a plurality of carboxyl groups, such as succinic acid and tartaric acid; arylcarboxylic acids including a plurality of carboxyl groups, such as phthalic acid and trimellitic acid; and alkylsulfonic acids, such as methanesulfonic acid and ethanesulfonic acid.

An inorganic acid refers to a mineral acid, such as hydrochloric acid, nitric acid, sulfuric acid, carbonic acid, or phosphoric acid. From the viewpoint of the optical density and the resistance to nozzle clogging, sulfuric acid can be selected.

Salts of those acids include organic acid salts, such as lithium citrate, sodium citrate, potassium citrate, lithium succinate, sodium succinate, potassium succinate, lithium formate, sodium formate, potassium formate, ammonium formate, lithium acetate, sodium acetate, lithium acetate, ammonium acetate, lithium propionate, sodium propionate, potassium propionate, lithium oxalate, sodium oxalate, potassium oxalate, lithium tartarate, sodium tartarate, potassium tartarate, lithium benzoate, sodium benzoate, potassium benzoate, ammonium benzoate, lithium phthalate, sodium phthalate, potassium phthalate, ammonium phthalate, lithium methanesulfonate, sodium methanesulfonate, potassium methanesulfonate, ammonium methanesulfonate, lithium ethanesulfonate, sodium ethanesulfonate, potassium ethane sulfonate, ammonium ethanesulfonate, lithium benzenesulfonate, sodium benzenesulfonate, potassium benzenesulfonate, and ammonium benzenesulfonate; and inorganic acid salts, such as lithium chloride, sodium chloride, potassium chloride, rubidium chloride, lithium bromide, sodium bromide, potassium bromide, rubidium bromide, lithium iodide, sodium iodide, potassium iodide, rubidium iodide, ammonium chloride, lithium nitrate, sodium nitrate, potassium nitrate, ammonium nitrate, lithium sulfate, potassium sulfate, ammonium sulfate, lithium carbonate, sodium carbonate, and potassium carbonate.

The salt used herein refers to a water-soluble salt including an anion derived from an organic acid or an inorganic acid, and a cation derived from an alkali metal, an alkaline-earth metal, an ammonium cation or a cation derived from an amine such as methylamine, ethylamine, dimethylamine, 2-hydroxyethylamine, di(2-hydroxyethyl)amine or tri(2-hydroxyethyl)amine. Although the salt is dissociated in the ink and present in a state of ions, it can be said for the sake of convenience that the ink contains a salt.

Aqueous Medium

The inkjet recording ink of the present embodiment contains water, and the water content can be 30.0% by mass or more relative to the total mass of the ink. The water content can be also 95.0% by mass or less. In addition, a water-soluble compound can be used in combination with water, and these are used as an aqueous medium in the inkjet recording ink. This water-soluble compound is hydrophilic, and a mixture of 20.0% by mass of water-soluble compound with water is homogeneous and does not cause phase-separation. Water-soluble compounds easy to vaporize are not suitable from the viewpoint of preventing solid-liquid separation and nozzle clogging, and a suitable compound may have a vapor pressure of 5.3 Pa or less at 20° C.

In addition, the inkjet recording ink contains another water-soluble compound having a hydrophilicity/hydrophobicity coefficient of 0.26 or more. The hydrophilicity/hydrophobicity coefficient is defined by formula (A):

$$\text{Hydrophilicity/hydrophobicity coefficient} = \frac{(20\% \text{ aqueous solution water activity}) - (\text{molar fraction of water in 20\% aqueous solution})}{1 - (\text{molar fraction of water in 20\% aqueous solution})} \quad (A)$$

In formula (A), 20% aqueous solution refers to an aqueous solution containing 20% by mass of water-soluble compound whose hydrophilicity/hydrophobicity coefficient is to be measured. Depending on the type of paper, a water-soluble compound having a hydrophilicity/hydrophobicity coefficient of 0.26 or more and less than 0.37 and another water-soluble compound having a hydrophilicity/hydrophobicity coefficient of 0.37 or more can be combined. Water-soluble compounds having hydrophilicity/hydrophobicity coefficients of less than 0.26 do not help produce a sufficient optical density. From the viewpoint of enhancing the optical density on plain paper, the water-soluble compound having a hydrophilicity/hydrophobicity coefficient of 0.26 or more can account for 50.0% by mass, such as 60.0% by mass or more or 70.0% by mass or more, of all the water-soluble compounds in the ink. In particular, the water-soluble compound having a hydrophilicity/hydrophobicity coefficient defined by equation (A) of 0.26 or more and less than 0.37 can be trimethylolpropane. Also, the water-soluble compound having a hydrophilicity/hydrophobicity coefficient of 0.37 or more can be a glycol of hydrocarbons having a carbon number of 4 to 7. Examples of such a glycol include 1,2-pentane diol, 1,2-hexanediol, 1,5-pentanediol, and 1,6-hexanediol. For example, 1,2-hexanediol can be used in an embodiment. In particular, 1,2-hexanediol has a water activity of 0.37 or more and a vapor pressure of 5.3 Pa at 20° C., and is thus suitable.

The ratio of the water-soluble compound having a hydrophilicity/hydrophobicity coefficient of 0.26 or more and less than 0.37 to the water-soluble compound having a hydrophilicity/hydrophobicity coefficient of 0.37 or more can be in the range of 9:1 to 1:2, such as 6:1 to 1:1, on a mass basis.

The water activity in equation (A) is defined by the equation:

water activity=(water vapor pressure of aqueous solution)/(water vapor pressure of pure water)

Water activity can be measured by various methods without particular limitation. For example, a Chilled Mirror dew point method can be suitable for materials used in the inkjet recording ink of the present embodiment. The hydrophilicity/hydrophobicity coefficient of a water-soluble compound mentioned herein is calculated using the water activity of solution of 20% by mass water-soluble compound in water, measured at 25° C. with AQUALOVE CX-3TE (manufactured by DECAGON), which is a water activity meter based on a Chilled Mirror dew point method.

According to the Raoult's Law, the rate of vapor pressure depression of a dilute solution is equal to the molar fraction of the solute and is independent of the types of solvent and solute. Therefore, the molar fraction of water in an aqueous solution is equal to the water activity. However, when water activities of aqueous solutions of various water-soluble compounds are measured, many of the water activities may not coincide with the molar fraction of water.

If the water activity of an aqueous solution is lower than the molar fraction of water, the water vapor pressure of the aqueous solution is smaller than the theoretical value, and the solute inhibits the evaporation of water. This suggests that the solute has a large hydration force. In contrast, if the water activity of an aqueous solution is higher than the molar fraction of water, it is thought that the solute has a small hydration force.

The present inventors have considered that the degree of hydrophilicity or hydrophobicity of the water-soluble compound contained in an ink greatly affects the promotion of solid-liquid separation between the self-dispersion pigment and the aqueous medium, and also the properties of the ink. Accordingly, the hydrophilicity/hydrophobicity coefficient expressed by equation (A) is defined.

For obtaining water activity, aqueous solutions of various water-soluble compounds are measured at a fixed concentration of 20% by mass. The conversion of hydrophilicity or hydrophobicity to equation (A) allows relative comparison among the hydrophilicities or hydrophobicities of various solutes even if the solutes have different molecular weights and accordingly the molar fractions of water differ. Since the water activity of an aqueous solution does not exceed 1, the maximum hydrophilicity/hydrophobicity coefficient is 1.

Table 1 shows the hydrophilicity/hydrophobicity coefficients defined by equation (A) of water-soluble compounds that can be used in the inkjet recording ink. However, the water-soluble compound used in the embodiments of the invention is not limited to these compounds.

TABLE 1

| Substance | Hydrophilicity/hydrophobicity coefficient |
|---|---|
| 1,2-Hexanediol | 0.97 |
| 1,2-Pentanediol | 0.93 |
| 3-Methyl-1,3-butanediol | 0.90 |
| 1,2-Butanediol | 0.90 |
| 2,4-Pentanediol | 0.88 |
| 1,6-Hexanediol | 0.76 |
| 1,7-Heptanediol | 0.73 |
| 3-Methyl-1,5-pentanediol | 0.54 |
| 1,5-Pentanediol | 0.41 |
| Trimethylolpropane | 0.31 |

TABLE 1-continued

| Substance | Hydrophilicity/hydrophobicity coefficient |
|---|---|
| Ethyleneurea | 0.30 |
| 1,2,6-Hexantriol | 0.28 |
| 1,2,3-Butanetriol | 0.22 |
| Sorbitol | 0.21 |
| Urea | 0.20 |
| Diethylene glycol | 0.15 |
| 1,2,4-Butanetriol | 0.15 |
| Glycerol | 0.11 |
| Diglycerol | 0.08 |
| Triethylene glycol | 0.07 |
| Polyethylene glycol 200 | −0.09 |
| Polyethylene glycol 600 | −0.43 |

A water-soluble compound having a desired hydrophilicity/hydrophobicity coefficient is selected from the water-soluble compounds that can be suitably used in an inkjet recording ink. The total content of water-soluble compounds in the ink can be 5.0% by mass, such as 6.0% by mass or more or 7.0% by mass or more. Also, it can be 50.0% by mass or less, such as 40.0% by mass or less or 30.0% by mass or less.

Surfactant

In order to achieve a well-balanced ejection stability, the inkjet recording ink of the present embodiment can contain a surfactant. For example, a nonionic surfactant can be used. Exemplary nonionic surfactants include ethylene oxide adducts, such as polyoxyethylene alkyl ethers and acetylene glycols. These nonionic surfactants have HLB (Hydrophile-Lipophile Balance) values of 10 or more. The surfactant content in the ink can be 0.1% by mass or more, such as 0.2% by mass or more or 0.3% by mass or more. Also, it can be 5.0% by mass or less, such as 4.0% by mass or less or 3.0% by mass or less.

Other Additives

For preparing an ink having desired physical properties, the inkjet recording ink may contain other additives, such as a viscosity modifier, an antifoaming agent, a preservative, a fungicide, an antioxidant and a penetrant, in addition to the above-described constituents.

Surface Tension

The inkjet recording ink of the present embodiment has a surface tension of 34 mN/m or less. Also, the surface tension of the ink can be 33 mN/m or less, such as 32 mN/m or less. Furthermore, it can be 20 mN/m or more, such as 23 mN/m or more or 26 mN/m or more. By controlling the surface tension of the ink in such a range, the resulting ink can produce the best effect. If the ink has a surface tension of more than 34 mN/m, the wetting of ink that has landed on the paper is slow because the surface tension of the ink is higher than the critical surface tension of plain paper. Hence, the penetration of the ink becomes slow. If the ink has a surface tension of 34 mN/m or less, the ink penetrates plain paper mainly by being absorbed into pores between cellulose fibers of the paper, that is, by pore absorption. If the ink has a surface tension of more than 34 mN/m, the ink penetrates plain paper mainly by being directly absorbed into cellulose fibers, that is, by fiber absorption. The pore absorption speed is much higher than the fiber absorption speed. Accordingly, in the present embodiment, the ink is designed so as to penetrate paper mainly by pore absorption, thus achieving high-speed fixing. The surface tension mentioned herein is measured by a vertical plate method, and more specifically with a surface tension meter CBVP-Z (manufactured by Kyowa Interface Science).

Viscosity

The viscosity of the inkjet recording ink of the present embodiment can be 15.0 mPa·s or less. When an inkjet recording apparatus is operated by thermal energy, an ink having a high viscosity may not be delivered in time for supply to the nozzle, and consequently an unclear image may be formed. Accordingly, the viscosity of the ink can be 10.0 mPa·s or less, such as 5.0 mPa·s or less.

Inkjet Recording Method

In an inkjet recording method according to an embodiment of the invention, a constant volume of ink of 0.5 to 6.0 pL can be applied by one ejection operation. For example, the volume of ink applied by one ejection operation can be 1.0 pL or more, such as 1.5 pL or more. Also, it can be 5.0 pL or less, such as 4.5 pL or less. If it is 0.5 pL or less, the resulting image may be inferior in fixity and water fastness. If it is more than 6.0 pL, small characters of about 2 to 5 points (1 point≈0.35 mm) may be printed in a thickened unclear state.

The constant volume of ink mentioned herein refers to a specific volume of ink ejected from nozzles of a recording head whose structures do not differ from each other without varying the driving energy for applying the ink. That is, the volume of ink to be applied is constant as long as the ink is ejected in this state, even if ejection is slightly varied due to the variation among apparatuses in manufacture. By setting the volume of ink to be applied to a constant value, the ink can penetrate to a stable depth to form a uniform recorded image having a high density. In contrast, when a system in which the volume of ink to be applied is varied is used, applied ink droplets have different volumes, and accordingly, the depth of penetration of the ink into plain paper is considerably varied. In particular, some of the high-duty portions of a recorded image may have a low image density due to the variation in penetration depth, and, thus, the uniformity of the image may be degraded.

A constant volume of ink can be applied by a thermal inkjet method using thermal energy. This method may be suitable in view of ejection mechanism. The thermal inkjet method can reduce the variation in penetration depth of ink, so that the resulting recorded image has a high density and good uniformity. Furthermore, the thermal inkjet method is more suitable for increasing the number of nozzles and increasing nozzle density than a method for ejecting ink using piezoelectric elements. Thus, it is suitable for high-speed recording.

According to the study of the present inventors, the use of the ink of the embodiment of the invention can prevent effectively the reduction of the optical density, which is liable to occur when at least one color ink forms a portion having a duty of 80% or more in an image in a basic matrix, that is, when a specific color ink is applied onto a basic matrix in a larger amount than the other color inks. The duty is calculated in an area of at least 50 μm×50 μm. Images having a duty of 80% or more refer to images in which ink is applied to 80% or more of the squares of the matrix of the portion whose duty is to be calculated. The size of the squares depends on the resolution of the basic matrix. For example, when the resolution of the basic matrix is 1200 dpi×1200 dpi, each square of the grid of the matrix measures $1/1200$ inches×$1/1200$ inches. Although a single color mentioned herein, desirably, has an identical color and a single tone, it may have slightly different tones. More specifically, when four color inks of black, cyan, magenta and yellow are used, an image is recorded in a basic matrix in such a manner that at least one color ink forms a portion having a duty of 80% or more. In an image not including a portion having a duty of 80% or more formed in a basic matrix with a single color ink, ink droplets that have landed on paper do not form overlaps and can avoid resulting in unclear thickened characters in many cases even though the printing process is not improved.

The basic matrix used in the present embodiment can be arbitrarily set by the recording apparatus or other means. The resolution of the basic matrix can be 600 dpi or more, such as 1200 dpi. However, if the resolution exceed 4800 dpi, the amount of ink applied is increased to degrade the qualities of images and characters. The upper limit of the resolution can be 4800 dpi or less. The resolutions in the vertical direction and in the lateral direction of the matrix may be the same or different as long as they are in the above range.

The total amount of ink applied to the basic matrix can be 5.0 μL/cm$^2$ or less. When four color inks of black, cyan, magenta and yellow are used, it is the total amount of the four color inks applied. If a single color ink, for example, only a black ink, is used, it is the total amount of the black ink applied. The portion in which the total amount of ink applied is calculated is the same as the portion in which the duty is calculated. If an image is formed so as to have a portion in which the total amount of all color inks applied exceeds 5.0 μL/cm$^2$, the resulting image may become unclear, or show-through unsuitable for duplex printing may occur.

For forming an image in the present embodiment, in view of enhancing the optical density, the application of a specific color ink to a basic matrix can be divided so that divided application operations are performed at a plurality of timings. When a several droplets of an ink are simultaneously ejected from a single nozzle line, the number of timings of application is one. The single nozzle line refers to a group of ejection orifices through which the same ink is ejected. The application operation is divided into two times or more. If it is divided into three times or more, the optical density of the recorded image is increased. The number of times of divided application operations can be 8 or less, such as 4 or less. If the number of times of divided application operations exceed 8, such operations are effective in preventing bleeding and in printing favorable small characters. However, the power of the ink hiding the surface of plain paper is reduced and the optical density is reduced accordingly.

The application of ink may be divided into at least two by a serial method or a line method. For example, when a serial printer is used for printing characters without spaces by two divided application operations, a recording head passes across a recording medium two times (two pass operations). When an application is divided, the amount of ink applied by each divided operation is often the same, but this does not apply always in any embodiments of the invention. FIG. 1 shows an exemplary arrangement of dots that have landed for 100% printing characters without spaces by two pass operations in which an amount of ink (first ink droplets) equivalent to 50% is applied onto a recording medium by the first pass and, then, an amount equivalent to the other 50% (second ink droplets) is applied onto the recording medium by the second pass.

Figure 3:
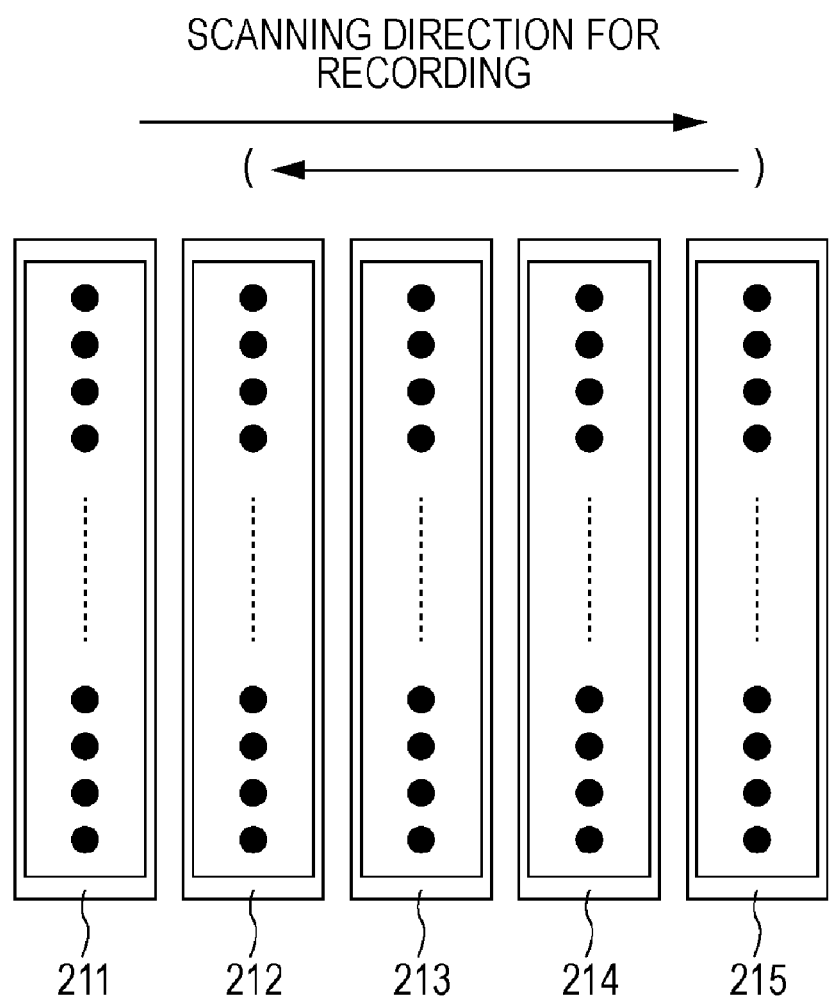
FIG. 3 is a representation of serial recording heads.

The inkjet recording ink of the present embodiment can also be applied to a case where ink is applied by a line method in which dots are printed in the same manner as FIG. 1 by two divided application operations during a single pass operation, in addition to cases where ink is applied by a serial method. For applying a black ink by two divided application operations during a single pass operation, recording heads shown in FIG. 3 may be used, for example. In FIG. 3, reference numerals 211, 212, 213, 214 and 215 represent lines for black (K), cyan (C), magenta (M), yellow (Y) and black (K), respectively. In this instance, a black ink is divided into two nozzle lines so as to be applied substantially by a single pass operation. By, for example, varying the number of nozzle lines of the head or the number of inks mounted on the head, a desired ink can be applied substantially by two divided application operations during a single pass operation.

The amount of the specific color ink to be applied at each timing is set at 0.7 µL/cm$^2$ or less. For example, it can be set at 0.6 µL/cm$^2$ or less, such as 0.5 µL/cm$^2$ or less. If the amount of the specific color ink applied at each timing exceeds 0.7 µL/cm$^2$, there can occur show-through, an unclear thickened character or bleeding.

The period from the beginning of the operation applying a specific color ink to a basic matrix to the end of the operation can be set within the range of 1 to 200 ms. That is, an image can be completed by applying an ink several times for a period of time in this range. By printing characters under this condition, the optical density and the quality of small characters can be enhanced. The period for applying ink can be 1 ms or more. In this instance, an operation until ink is finally applied to a basic matrix from a time when the ink is first applied to the basic matrix has an idle time for a specific period. The reason can be the following. If the last ink droplet lands on plain paper before the first ink droplet is sufficiently fixed, the ink droplets are combined into a large droplet (beading). Since the large droplet penetrates the plain paper deep through a rather large pore, the optical density may be degraded. Also, the large ink droplet may spread laterally along fibers of the plain paper, so that the sharpness of characters may be lost.

If a specific color ink is applied to a basic matrix by at least three divided operations, the intervals between the divided operations can be set at 1 ms or more. By recording an image under this condition, it is alleviated that the resulting image formed by combining ink droplets is degraded in image density and character quality. Even if a specific color ink is applied to a basic matrix for a period of more than 200 ms, the effect hardly changes from the effect produced when the application is performed for a period of 200 ms. Accordingly, in order to achieve high-speed printing, the period can be set at 200 ms or less. The period for applying a specific color ink to a basic matrix can be set at 1 ms or more, such as 4 ms or more or 8 ms or more. Furthermore, in an embodiment, it may be set at 12 ms or more. By setting the period for applying a specific color ink to a basic matrix as above, the best effect of the ink according to the present embodiment can be produced. That is, high-speed inkjet recording capable of producing high-quality images having a high image density can be achieved. In order to achieve the application of ink at such timing, a single color ink can be applied to a basic matrix from a plurality of nozzle lines of a single recording head at all the timings.

Inkjet Recording Apparatus

An inkjet recording apparatus according to an embodiment of the invention will now be described. In the present embodiment of the invention, an inkjet recording apparatus may be used which includes a recording head applying an ink in a constant volume of 0.5 to 6 pL. The recording head can be a type that ejects ink by applying a thermal energy to the ink. This type of recording head is more suitable for increasing the density of nozzles than a recording head ejecting ink using piezoelectric elements. In addition, it is superior in ejecting a constant volume of ink, and, accordingly, the variation in penetration depth of the ink can be reduced to enhance the uniformity of the recorded image.

A recording head that ejects ink by applying a thermal energy to the ink can be configured according to the structure and principle disclosed in U.S. Pat. Nos. 4,723,129 and 4,740, 796. Such a recording head can be applied to a so-called on-demand type and a continuous type. In an embodiment, an on-demand type may be advantageous. An on-demand type recording head includes an electrothermal convertor disposed corresponding to a sheet or a liquid pass that holds ink. At least one driving signal for rapidly increasing the temperature over a temperature causing nucleate boiling is applied to the electrothermal convertor according to recording information. By applying the signal, the electrothermal convertor generates thermal energy to boil the surface of the recording head to which heat is applied. Consequently, air bubbles are formed in inks corresponding to the respective driving signals. Ink is ejected through each ejection orifice to form at least one droplet by growth and contraction of the air bubbles. By pulsing the driving signal, air bubbles can be immediately and appropriately grown or contracted, so that a constant volume of ink can be ejected with good response.

Figure 2:
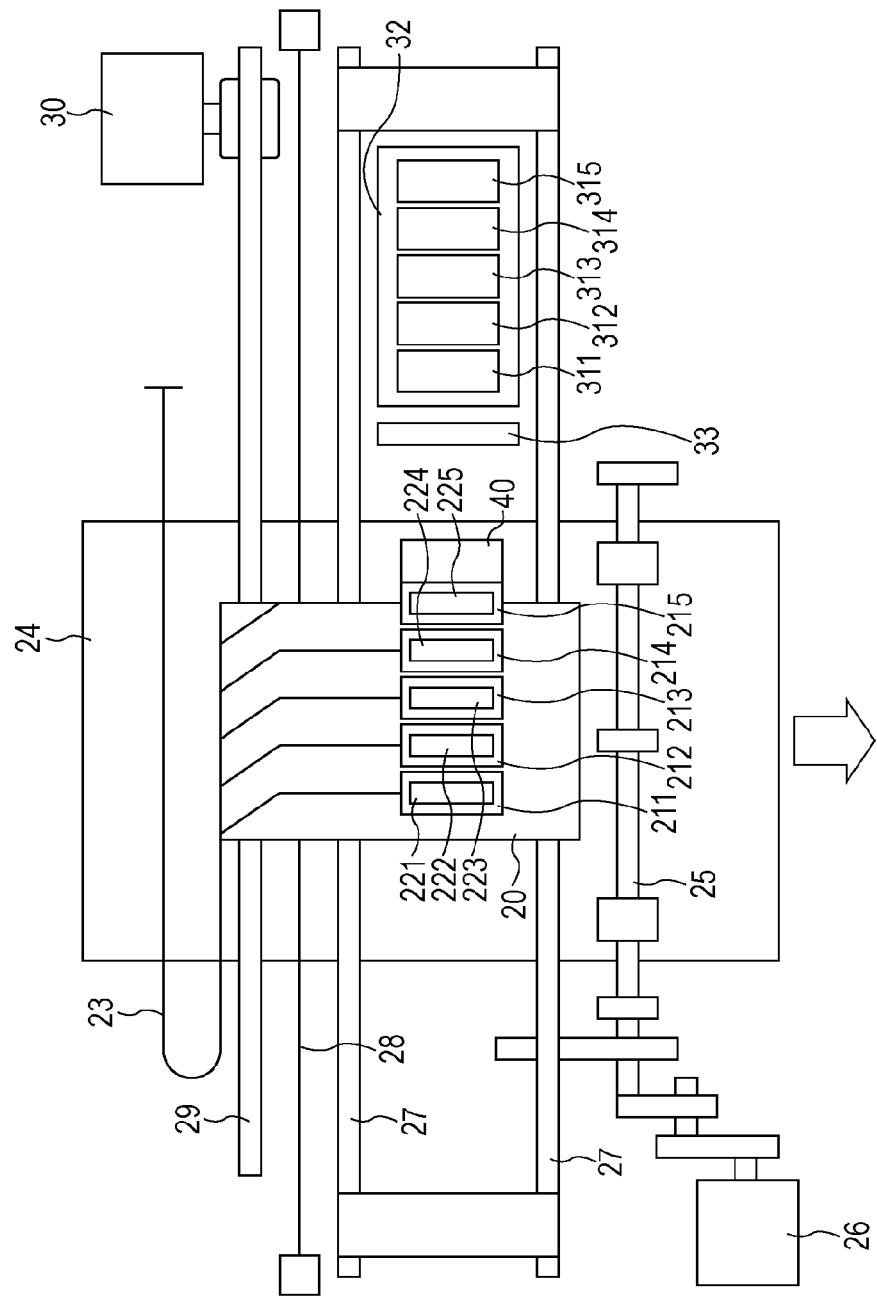
FIG. 2 is a schematic diagram of an inkjet recording apparatus.

FIG. 2 is a schematic diagram of an inkjet recording apparatus that can be used in the present embodiment of the invention. The inkjet recording apparatus includes a carriage 20 on which a recording head ejecting ink by an inkjet recording method is mounted. The recording head has a plurality of nozzle lines 211 to 215. In order to apply a black ink by two divided application operations during a single pass operation, the recording head may be configured so that the nozzle lines 211, 212, 213, 214 and 215 eject the black (K) ink, a cyan (C) ink, a magenta (M) ink, a yellow (Y) ink and the black (K) ink, respectively. Ink cartridges 221 to 225 are each defined by the recording head, one of the nozzle lines 211 to 215, and an ink tank that supplies an ink to the corresponding nozzle line. A density sensor 40 is provided. The density sensor 40 is of a reflective type, and is disposed on a side of the carriage 20 so as to detect the density of a test pattern recorded on a recording medium. Control signals and other signals are transferred to the recording head through a flexible cable 23.

A recording medium 24 whose cellulose fibers are exposed, such as plain paper, is pinched by paper-ejecting rollers 25 through a conveying roller (not shown) and transported in the direction (sub-scanning direction) indicated by the arrow according to the operation of a conveying motor 26.

The carriage 20 is supported and guided by a guide shaft 27 and a linear encoder 28. The carriage 20 is reciprocally moved in the main scanning direction along the guide shaft 27 with a driving belt 29 by the operation of a carriage motor 30. The recording head includes therein (in the liquid pass) a heater element (electrothermal energy convertor) generating thermal energy for ejecting ink. When the linear encoder 28 has read data, the heater element is operated to eject ink onto the recording medium according to the recording signal. The ink that has landed on the medium thus forms an image.

A recovery unit including cap portions 311 to 315 is disposed at the home position of the carriage 20 located outside the recording region. When recording is not performed, the carriage 20 is located at the home position so that the nozzle lines 211 to 215 are sealed with the respective cap portions 311 to 315. Thus the ink can be prevented from being hardened by the evaporation of the solvent from the ink, or being clogged with foreign matter such as dust. The cap portions are also intended to prevent an infrequently-used ink from failing to be ejected at the ejection orifice, or from clogging the ejection orifice. More specifically, the cap portions are used for idle ejection that is performed to prevent ejection failure in such a manner that ink is ejected to the cap portion disposed apart from the ejection orifice. Also, the cap portions are used for recovering the function of the ejection orifice that has caused ejection failure. This is performed by sucking the ink from the ejection orifice covered with the cap portion using a pump (not shown).

An ink receiver 33 receives ink droplets preliminarily ejected when the recording head passes over the ink receiver 33 immediately before recording operation. A blade or wiping member (not shown) is provided at a position adjacent to the cap portions. The faces of the nozzle lines 211 to 215 at which the ejection orifices are formed can be cleaned with the blade or wiping member.

As described above, a recovery device or a backup device can be provided to the recording apparatus from the viewpoint of further stabilizing the recording operation. Examples of such a device include a capping device, a cleaning device, a compressing or sucking device, or a preheating device including an electrothermal convertor or another heater element or both. From the viewpoint of performing stable recording, a pre-ejection mode operation is useful which performs ejection not intended for recording.

A cartridge-type recording head may be used which has the above-described structure and is integrated with an ink tank. Also, a replaceable chip-type recording head may be used. This type can be electrically connected to a recording apparatus and allows ink to be supplied from the apparatus, by being installed to the recording apparatus.

FIG. 3 shows the structure of a recording head having nozzle lines 211 to 215. The recording head performs recording in the direction indicated by the arrow shown in the figure. The recording head has a plurality of nozzle lines 211 to 215 extending in the direction substantially perpendicular to the scanning direction for recording. While moving for scanning in the scanning direction shown in the figure, the recording head ejects ink droplets from the ejection orifices at a predetermined timing. An image is thus formed on a recording medium at a recording resolution according to the density of the nozzle arrangement. In this instance, the recording head may move in either direction of the scanning directions for recording. It may move reciprocally for recording.

Figure 4:
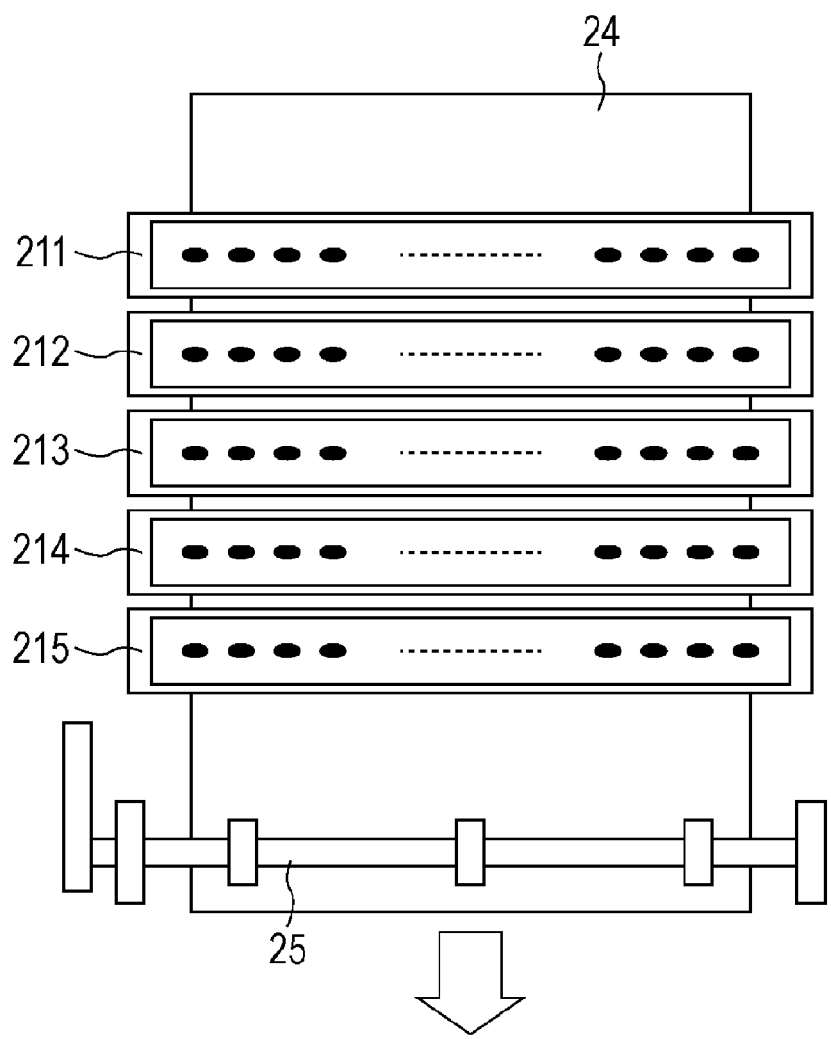
FIG. 4 is a representation of line recording heads.

Although the recording apparatus used in the above embodiment is of a serial type that performs recording by scanning the recording head, a full-line recording apparatus may be used which includes a recording head having a length corresponding to the width of the recording medium. For a full-line recording apparatus, serial recording heads as shown in FIG. 3 are arranged in a staggered manner or in parallel with each other to be lengthened to a desired length. Alternatively, an integrated single recording head may be used in which a longer nozzle line is provided, as shown in FIG. 4.

In the serial and full-line recording apparatuses described above, four color inks (Y, M, C and K) are arranged independently or integrally. The recording heads shown in FIGS. 3 and 4 each have a structure having five nozzle lines in which a black ink is assigned to two nozzle lines 211 and 215 so that only the black ink is applied by two divided application operations. Alternatively, a structure having four nozzle lines may be used for applying an ink by about 2 to 12 divided application operations. For such an embodiment, at least one color ink of the four color inks (Y, M, C and K) can be assigned to a plurality of nozzle lines. For example, two or three recording heads each having four nozzle lines may be connected into a structure having eight nozzle lines or 12 nozzle lines. For applying a single color ink at a plurality of timings, the ink can be applied by two divided application operations during a single scanning operation. For example, for applying a black ink by two divided application operations during a single scanning operation, a structure using the recording head shown in FIG. 3 may be used. The nozzle lines 211, 212, 213, 214 and 215 can eject inks of black (K), cyan (C), magenta (M), yellow (Y) and black (K), respectively. By varying the speed of the carriage on which the recording head is mounted and the distance between the two black nozzle lines, the period of time for application of the single color ink (black ink) to a basic matrix can be controlled in the range of 1 to 200 ms.

For forming an image in such a manner that ink is applied in a total volume of 5.0 µL/cm$^2$ or less to a basic matrix in which a specific color has a duty of 80% or more, the inkjet recording apparatus of the present embodiment applies the specific color ink at a plurality of timings. The volume of ink applied by each divided application operation is controlled to 0.7 µL/cm$^2$ or less. The period from the beginning of the operation applying a specific ink to a basic matrix to the end of the operation can be set in the range of 1 to 200 ms. The inkjet recording apparatus of the present embodiment includes a control mechanism for applying an ink by divided operations. The control mechanism controls the operation of the recording head and the timing of operation for transporting plain paper so that ink can be applied by the above-described divided operations.

The number of divided application operations for a specific color ink can be set according to the desired recording conditions. FIG. 1 shows an example in which the application of an ink is divided into two operations. In this instance, an image including a portion having a duty of 100% is formed in a basic matrix having a resolution of 1200 dpi (in the lateral direction)×1200 dpi (in the vertical direction). In FIG. 1, positions on which the first ink droplets have landed are represented by blank circles, and positions on which the second ink droplets have landed are represented by solid circles. The first ink droplets and the second ink droplets each have the same volume.

EXAMPLES

The present invention will be further described in detail with reference to Examples and Comparative Examples. In the following description, "part(s)" and "%" are on a mass basis unless otherwise specified.

Examples 1 to 7, Comparative Examples 1 to 8

Coloring Material

BONJET BLACK CW-2 (produced by Orient Chemical Industries, pH=6.4) and CAB-O-JET 300 (produced by Cabot, pH=7.3), which are aqueous dispersion of an anionic self-dispersion pigment, were used, and the self-dispersion pigments in the aqueous dispersions are used as coloring materials of inks.

Preparation of Inks

Inks of Examples 1 to 7 (Inks 1 to 7) and Comparative Examples 1 to 8 (Inks 8 to 15) were prepared as below. For preparing Inks 1 to 15, all the constituents (100 parts in total) of each ink were mixed according to the composition shown in Table 2, and then the mixture was adjusted to a pH shown in Table 2 with hydrochloric acid or an aqueous solution of cesium hydroxide. After mixing for 1 hour, the mixture was filtered through a 2.5 µm pore filter. The values of pigments shown in Table 2 each represent the amount of solid content (self-dispersion pigment) in the ink. Ion exchanged water is used as water. Acetylenol EH is a nonionic surfactant produced by Kawaken Fine Chemical. The surface tensions of the inks were measured with a surface tension meter CBVP-Z manufactured by Kyowa Interface Science. The amount of anionic functional groups was calculated from the result measured with a sodium ion meter C-122 manufactured by Horiba. The amount of cesium ion in the ink was calculated from the total amount of cesium salts.

TABLE 2

|  |  | Example 1 Ink 1 | Example 2 Ink 2 | Example 3 Ink 3 | Example 4 Ink 4 | Example 5 Ink 5 | Example 6 Ink 6 | Example 7 Ink 7 |
|---|---|---|---|---|---|---|---|---|
| Self-dispersion pigment (part) | BONJET CW-2 | 5.0 | 5.0 | 5.0 | — | — | — | — |
|  | CAB-O-JET300 | — | — | — | 5.0 | 5.0 | 5.0 | 5.0 |
| Salt (part) | Cesium sulfate | 0.91 | — | — | — | — | 0.91 | 0.36 |
|  | Cesium methanesulfonate | — | 1.14 | — | — | — | — | — |
|  | Cesium tartrate | — | — | 1.03 | — | — | — | — |
|  | Cesium chloride | — | — | — | 0.84 | 0.42 | — | — |
|  | Sodium sulfate | — | — | — | — | — | — | — |
|  | Ammonium sulfate | — | — | — | — | — | — | — |
|  | Potassium sulfate | — | — | — | — | — | — | — |
|  | Sodium chloride | — | — | — | — | — | — | — |
|  | Potassium chloride | — | — | — | — | — | — | — |
| Trimethylolpropane (part) | | 15.0 | 15.0 | 15.0 | 15.0 | 15.0 | 15.0 | 15.0 |
| 1,2-Hexanediol (part) | | 5.0 | 5.0 | 5.0 | 5.0 | 5.0 | 5.0 | 5.0 |
| Glycerol | | — | — | — | — | — | — | — |
| Acetylenol EH (part) | | 1.0 | 1.0 | 1.0 | 1.0 | 1.0 | 1.0 | 1.0 |
| PH adjuster: Cesium hydroxide (part) | | — | 0.28 | 0.45 | — | — | — | — |
| Water | | Balance | Balance | Balance | Balance | Balance | Balance | Balance |
| pH | | 6.2 | 6.2 | 6.2 | 7.1 | 7.1 | 7.1 | 7.1 |
| Surface tension (mN/m) | | 32 | 32 | 32 | 31 | 31 | 31 | 31 |
| Anionic functional group X (μmol/g) | | 20 | 20 | 20 | 9.7 | 9.7 | 9.7 | 9.7 |
| Cesium ion Y (μmol/g) | | 50.0 | 52.8 | 54.5 | 50.0 | 25.0 | 50.0 | 20.0 |
| Y − X (μmol/g) | | 30.0 | 32.8 | 34.5 | 40.3 | 15.3 | 40.3 | 10.3 |

|  |  | Comparative Example 1 Ink 8 | Comparative Example 2 Ink 9 | Comparative Example 3 Ink 10 | Comparative Example 4 Ink 11 | Comparative Example 5 Ink 12 | Comparative Example 6 Ink 13 | Comparative Example 7 Ink 14 | Comparative Example 8 Ink 15 |
|---|---|---|---|---|---|---|---|---|---|
| Self-dispersion pigment (part) | BONJET CW-2 | 5.0 | 5.0 | 5.0 | 5.0 | — | — | — | 5.0 |
|  | CAB-O-JET300 | — | — | — | — | 5.0 | 5.0 | 5.0 | — |
| Salt (part) | Cesium sulfate | 0.27 | — | — | — | — | — | — | 0.91 |
|  | Cesium methanesulfonate | — | — | — | — | — | — | — | — |
|  | Cesium tartrate | — | — | — | — | — | — | — | — |
|  | Cesium chloride | — | — | — | — | 0.08 | — | — | — |
|  | Sodium sulfate | — | 0.35 | — | — | — | — | — | — |
|  | Ammonium sulfate | — | — | 0.33 | — | — | — | — | — |
|  | Potassium sulfate | — | — | — | 0.44 | — | — | — | — |
|  | Sodium chloride | — | — | — | — | — | 0.29 | — | — |
|  | Potassium chloride | — | — | — | — | — | — | 0.37 | — |
| Trimethylolpropane (part) | | 15.0 | 15.0 | 15.0 | 15.0 | 15.0 | 15.0 | 15.0 | — |
| 1,2-Hexanediol (part) | | 5.0 | 5.0 | 5.0 | 5.0 | 5.0 | 5.0 | 5.0 | — |
| Glycerol | | — | — | — | — | — | — | — | 20.0 |
| Acetylenol EH (part) | | 1.0 | 1.0 | 1.0 | 1.0 | 1.0 | 1.0 | 1.0 | 1.0 |
| PH adjuster: Cesium hydroxide (part) | | — | — | — | — | — | — | — | — |
| Water | | Balance | Balance | Balance | Balance | Balance | Balance | Balance | Balance |
| pH | | 6.2 | 6.1 | 6.1 | 6.0 | 7.1 | 7.0 | 7.0 | 6.5 |
| Surface tension (mN/m) | | 32 | 32 | 32 | 32 | 31 | 31 | 31 | 29 |
| Anionic functional group X (μmol/g) | | 20 | 20 | 20 | 20 | 9.7 | 9.7 | 9.7 | 20 |
| Cesium ion Y (μmol/g) | | 15.0 | 0.0 | 0.0 | 0.0 | 5.0 | 0.0 | 0.0 | 50.0 |
| Y − X (μmol/g) | | −5.0 | −20.0 | −20.0 | −20.0 | −4.7 | −9.7 | −9.7 | 30 |

Examples 8 to 23, Comparative Examples 9 to 16

Images were formed with Inks 1 to 15 prepared above by the following method, and the optical density of each image and the resistance to nozzle clogging of each ink were evaluated.

Formation of Image

For evaluating recorded images, the following plain papers were used: Office Planner Paper, SW-101 paper and GF500 paper (manufactured by Canon Marketing Japan), Xerox 4200 (manufactured by Xerox), and HP Bright White Inkjet Paper (manufactured by Hewlett Packard). The following inkjet recording apparatus was used:

F900 (manufacture by Canon, recording head: 6 liens of ejection orifices, each having 512 nozzles, ink volume: 4.0 pL (constant), maximum resolution: 1200 dpi (lateral direction)×1200 dpi (vertical direction))

Recording Method A

An ink to be subjected to evaluation was placed in two ink tanks. The tanks were respectively mounted on the black ink head portion and the cyan ink head portion of the printer, and printing without spaces was performed. In this instance, the time lag between the ejection of ink from the black ink head portion and the ejection of ink from the cyan ink head portion was 12 ms. For printing without spaces by two divided application operations, a constant amount of ink of 0.5 μL/cm$^2$ was ejected for each ejection orifice line, and thus 1.0 μL/cm$^2$ of the ink was applied in total.

Recording Method B

An ink to be subjected to evaluation was placed in an ink tank. The tank was mounted on the black ink head portion of the printer, and printing without spaces was performed. In this instance, printing was performed without spaces by divided operations in which the ink head scans two times (2-pass printing). Ink was applied in a constant amount of 0.5 μL/cm$^2$ for each scanning operation, and scanning was performed twice for applying 1.0 μL/cm² of ink in total.

Recording Method C

An ink to be subjected to evaluation was placed in an ink tank. The tank was mounted on the black ink head portion of the printer, and printing without spaces was performed. In this instance, printing was performed without spaces by an operation in which the ink head scans once (1-pass printing). Ink was applied in a total amount of 1.0 μL/cm² by one scanning operation.

Optical Density of Image

The optical density of a solid portion in an image was measured with a densitometer RD915 (manufactured by Macbeth). The average of optical densities of images printed on the above five papers was evaluated according to the following criteria:
AA: 1.38 or more
A: 1.35 or more and less than 1.38
B: 1.30 or more and less than 1.35
C: less than 1.30

Resistance to Nozzle Clogging

After the above printing test, the nozzles were allowed to stand at room temperature for 2 weeks without being sealed with caps. After recovering operation was applied, a nozzle check pattern was printed, and the pattern was visually observed and evaluated according to the following criteria:
A: Normal printing can be performed after a single cleaning operation (sucking ink at the ejection orifices of the recording head).
B: Normal printing is not possible after a single cleaning operation, but it can be performed after three cleaning operations.
C: Normal printing is not possible even after three cleaning operations, but it can be performed after three strong cleaning operations (sucking ink at the ejection orifices of the recording head more strongly than the above cleaning operation).
D: Even after strong cleaning operations were repeated 3 times, ejection cannot be stably performed, and thus normal printing cannot be performed.

The results of revaluations are shown in Table 3.

TABLE 3

| | Ink | Recording method | Optical density | Resistance to clogging |
|---|---|---|---|---|
| Example 8 | 1 | A | AA | A |
| Example 9 | 1 | B | AA | A |
| Example 10 | 1 | C | A | A |
| Example 11 | 2 | A | AA | A |
| Example 12 | 2 | B | AA | A |
| Example 13 | 2 | C | A | A |
| Example 14 | 3 | A | AA | A |
| Example 15 | 3 | B | AA | A |
| Example 16 | 4 | A | AA | A |
| Example 17 | 4 | B | AA | A |
| Example 18 | 5 | A | AA | A |
| Example 19 | 5 | B | AA | A |
| Example 20 | 6 | A | AA | A |
| Example 21 | 6 | B | AA | A |
| Example 22 | 7 | A | A | A |
| Example 23 | 7 | B | A | A |
| Comparative Example 9 | 8 | A | B | A |
| Comparative Example 10 | 9 | A | C | A |
| Comparative Example 11 | 10 | A | B | B |
| Comparative Example 12 | 11 | A | AA | D |
| Comparative Example 13 | 12 | A | B | A |
| Comparative Example 14 | 13 | A | C | A |
| Comparative Example 15 | 14 | A | A | C |
| Comparative Example 16 | 15 | A | C | A |

As shown in Table 3, Examples 8 to 23 using Inks 1 to 7 (Examples 1 to 7) that contained a larger amount of cesium ion more than the amount of anionic functional group produced images having high optical densities, and favorably reduced nozzle clogging.

On the other hand, Comparative Examples 9 to 16 using Inks 8 to 15 (Comparative Examples 1 to 8) that contained a smaller amount of cesium ion than the amount of anionic functional group produced images having low optical densities or caused nozzles to be clogged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-039064 filed Feb. 24, 2010, which is hereby incorporated by reference herein in its entirety.

What is claimed is:

1. An inkjet recording ink having a surface tension of 34 mN/m or less, the inkjet recording ink comprising:
water;
an anionic self-dispersion pigment having an anionic functional group;
a cesium ion; and
a water-soluble compound having a hydrophilicity/hydrophobicity coefficient of 0.26 or more,
wherein the inkjet recording ink contains X mol/g in total of the anionic functional group and Y mol/g of the cesium ion, satisfying the relationship X<Y, and
wherein the hydrophilicity/hydrophobicity coefficient is defined by equation (A):

$$\text{Hydrophilicity/hydrophobicity coefficient} = \frac{(20\% \text{ aqueous solution water activity}) - (\text{molar fraction water in } 20\% \text{ aqueous solution})}{1 - (\text{molar fraction of water in } 20\% \text{ aqueous solution})}. \quad (A)$$

2. An inkjet recording method comprising:
forming an image by applying the inkjet recording ink as set forth in claim 1 in a constant volume in the range of 0.5 to 6.0 pL onto a basic matrix on plain paper,
wherein when an image including a portion formed at a duty of 80% or more by applying the ink in a total volume of 5.0 μL/cm² or less is formed in the basic matrix, the volume of the ink to be applied is divided so that the ink is applied by a plurality of times of operations, each operation applying the ink in a volume of 0.7 μL/cm² or less.

* * * * *